United States Patent [19]

Hajek, II et al.

[11] 4,334,553
[45] Jun. 15, 1982

[54] RESETTABLE VALVE SPOOL WITH KICK-OUT MEMBER

[75] Inventors: Thomas J. Hajek, II, Lockport; Larry W. Lorimor, Joliet, both of Ill.

[73] Assignee: Caterpillar Tractor Co., Peoria, Ill.

[21] Appl. No.: 137,652

[22] Filed: Apr. 7, 1980

Related U.S. Application Data

[62] Division of Ser. No. 939,526, Sep. 5, 1978, abandoned.

[51] Int. Cl.³ .................. F15B 13/042; F16K 31/143
[52] U.S. Cl. ........................... 137/625.66; 137/624.27
[58] Field of Search ................... 92/129; 137/624.27, 137/625.66; 91/433, 234

[56] References Cited

U.S. PATENT DOCUMENTS

| 1,940,388 | 12/1933 | Callahan | 91/234 |
| 2,312,464 | 3/1943 | Ziebolz | 91/433 |
| 2,473,687 | 6/1949 | Kershaw | 248/354 H |
| 2,874,720 | 2/1959 | Vahs | 137/624.27 |
| 2,944,520 | 7/1960 | Swansan | 91/234 X |
| 3,859,791 | 1/1975 | Allen et al. | 91/433 X |
| 3,895,561 | 7/1975 | Felderhof | 91/234 X |

FOREIGN PATENT DOCUMENTS 219471  5/1942  Switzerland ........................ 92/129

Primary Examiner—Irwin C. Cohen
Attorney, Agent, or Firm—Paul S. Lempio

[57] ABSTRACT

This invention pertains to a control valve (14) having a double-acting kick-out member (36) attached to an end of a spool (33) thereof to return the spool (33) to a neutral position after actuation thereof. The invention is particularly useful in a fluid control circuit (10) wherein the control valve (14) is adapted to selectively communicate pressurized fluid to an actuator (13), such as a double-acting hydraulic cylinder.

1 Claim, 3 Drawing Figures

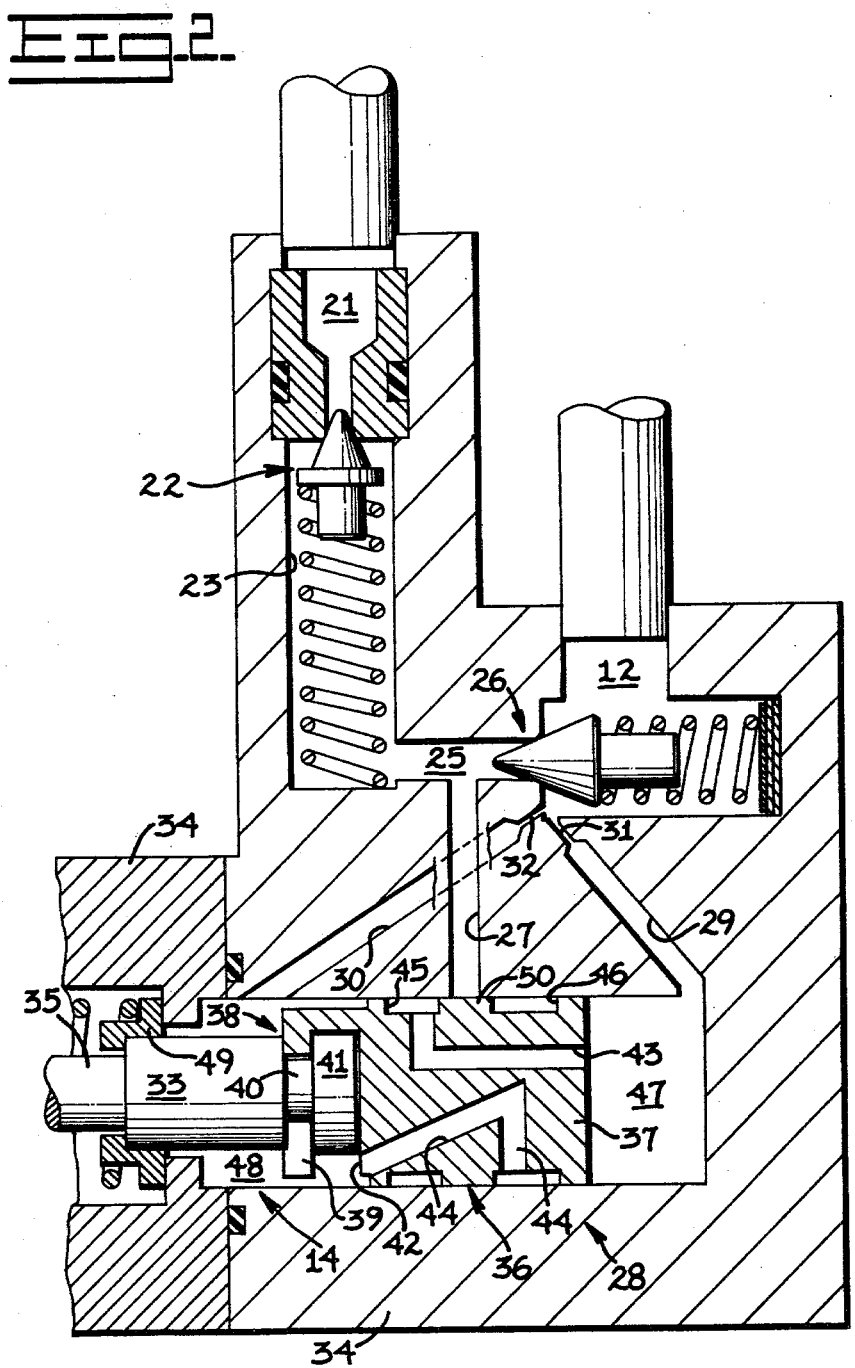

4,334,553

RESETTABLE VALVE SPOOL WITH KICK-OUT MEMBER

This is a division of Ser. No. 939,526, filed Sept. 5, 1978 now abandoned.

TECHNICAL FIELD

This invention relates to a double-acting kick-out member adapted to be attached to an end of a spool of a directional control valve to return the spool, in response to fluid pressure, to a neutral position subsequent to actuation thereof.

It is desirable in fluid control circuits of the type including a directional control valve for selectively actuating a double-acting cylinder to return the spool of the control valve to a neutral position once the desired fluid pressure has been established in either end of the cylinder. The cylinder may be of the type employed on a construction vehicle for selectively moving a ripper attachment thereon. For example, once the cylinder has been pressurized, to lower the ripper into the ground for ripping purposes or to fully raise the ripper to clear the ground and obstacles thereon, it is desirable to automatically move the spool of the control valve to a neutral position to trap such fluid pressure in the ripper cylinder. This kickout feature is particularly useful since the operator of the vehicle normally cannot see when the ripper is either fully lowered or raised.

The movement of the spool of the control valve back to its neutral position, once the peak working pressure has been established in the cylinder and the ripper has been fully lowered or raised, is desirable to avoid overheating of the fluid circuit and to prevent having to run fluid through a relief valve thereof. In conventional control circuits of this type, a kick-out mechanism is either associated with each end of the spool of the control valve or is separated from the control valve as a separate unit to thus provide a somewhat complex and bulky valve package and associated lines and fluid passages. Furthermore, kick-out mechanisms of this type require close calibration to achieve the kick-out function.

DISCLOSURE OF THE INVENTION

The present invention is directed to overcoming one or more of the problems as set forth above.

The invention comprises a resettable valve spool of the three-position inlet and exhaust type having a kick-out member attached by relative lateral movement to an end thereof. First and second passage means communicate fluid from inlets thereof to opposite, pressure-responsive ends of the kick-out member. The inlets are defined by a pair of grooves formed on the kick-out member and separated longitudinally by an annular land.

BRIEF DESCRIPTION OF THE DRAWINGS

Other objects of this invention will become apparent from the following description and accompanying drawings, wherein:

FIG. 2 is an enlarged sectional view, illustrating such kick-out means; and

BEST MODE FOR CARRYING OUT THE INVENTION

General Description

Figure 1:
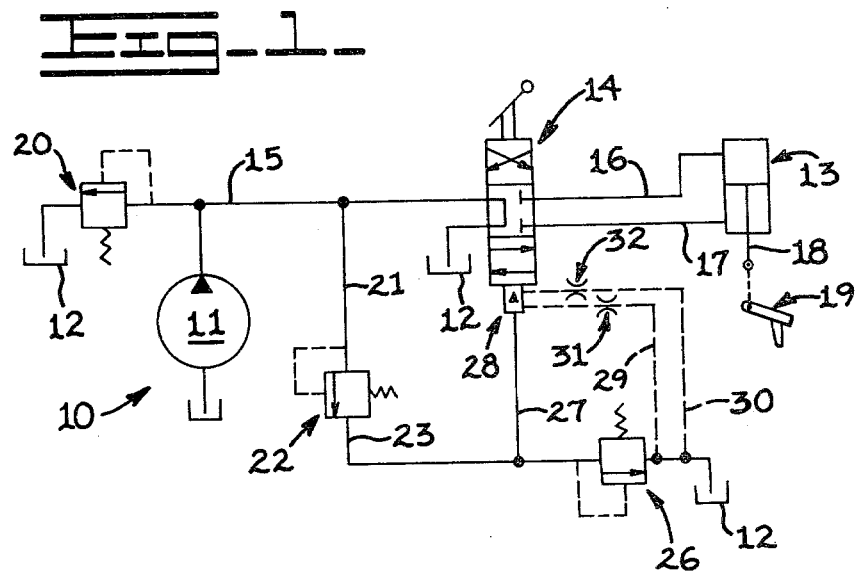
FIG. 1 schematically illustrates a fluid control circuit employing a kick-out means embodiment of the present invention therein.

FIG. 1 illustrates a fluid (hydraulic) control circuit 10 comprising a pressurized fluid source, including an engine-driven pump 11 and a tank or reservoir 12. The source is adapted to communicate pressurized fluid to an actuator 13 under control of a directional control valve 14, suitably connected between lines 15, 16 and 17. Fluid actuator 13 may comprise the illustrated double-acting cylinder having a piston 18 thereof suitably connected to a work tool 19, such as a ripper attachment employed on a construction vehicle.

Directional control valve 14 is sequentially movable through a first position connecting line 15 with line 17 and further connecting line 16 with tank 12 to retract cylinder 13, a second or neutral position illustrated in FIG. 1 wherein line 15 is connected directly to tank 12 and lines 16 and 17 are blocked, and a third position wherein line 15 connects with line 16 and line 17 connects with tank 12 to extend cylinder 13. The operator may thus control the working positions of tool 19 by selectively manipulating directional control valve 14 in a conventional manner. A standard relief valve 20 is connected in line 15 to vent inordinately high system pressures to tank 12.

Line 15 further connects with a line 21 having an inline relief valve 22 connected therein which will open when the working pressure in cylinder 13 exceeds a predetermined level (e.g., 2,200 psi) when the cylinder is fully extended or retracted. Fluid pressure is thus communicated to a line 23 and to a relief valve 26 which maintains the level of fluid pressure in line 23 at 250 psi, for example.

As described in more detail hereinafter, a line 27 is connected to line 23 to communicate fluid pressure (e.g., 250 psi) to a kick-out means 28 which is associated with one end of directional control valve 14 to automatically return the valve to its illustrated neutral position after the directional control valve has been actuated to one of its above-mentioned first or third positions, and a peak working pressure (e.g., 2,200 psi) has been realized in fully extended or retracted cylinder 13. A pair of drain passages 29 and 30, having restricted orifices 31 and 32 connected therein, respectively, are interconnected between tank 12 and kick-out means 28 for purposes hereinafter described.

As suggested above, kick-out means 28 is compactly arranged at one end of directional control valve 14 to efficiently return the valve to its neutral position, illustrated in FIG. 1, upon actuation of cylinder 13. Lines 16 and 17 are thus blocked whereby line 15 connects directly with tank 12 to prevent overheating of control circuit 10 and to prevent the need for exhausting fluid through relief valve 20.

DETAILED DESCRIPTION

Figure 3:
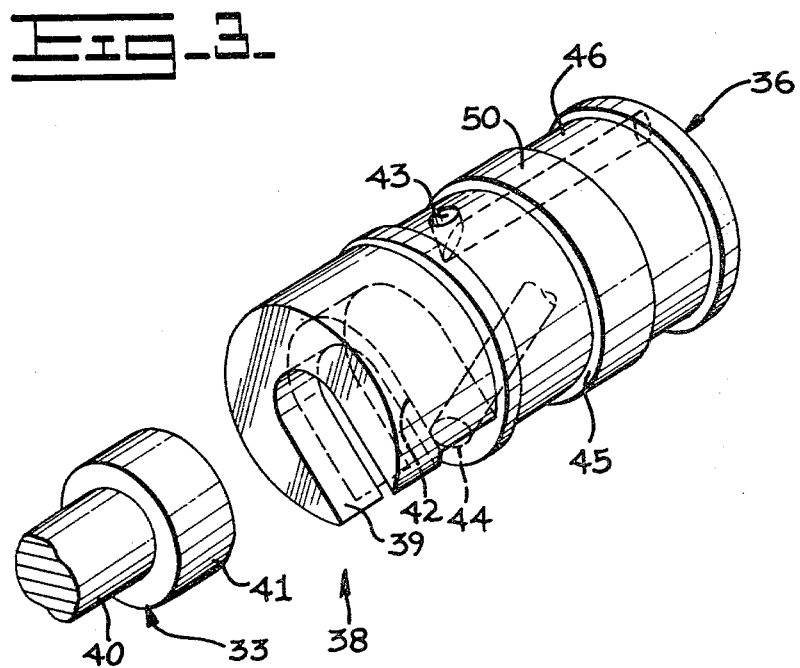
FIG. 3 is an isometric view of a kick-out member of the kick-out means and an end of a valve spool adapted for attachment thereto.

Referring to FIG. 2, directional control valve 14 comprises a spool 33 reciprocally mounted in a multi-part housing 34 and spring biased towards its illustrated neutral position by at least one compression coil spring 35 in a conventional manner. Kick-out means 28 comprises a generally annular kick-out member 36 having a body portion 37 and an attachment means 38 at an end of the body portion for detachably connecting the member to valve spool 33 for simultaneous movement therewith. In particular, the attachment means comprises a U-shaped slot 39 formed in an end of member 36 to straddle a reduced diameter portion 40 of spool 33. An annular end portion or boss 41 of the spool is disposed in a slot 42 of member 36 to thus securely lock the member to an end of spool 33. FIG. 3 more clearly illustrate the construction of kick-out member 36.

FIG. 2 further illustrates a pair of first and second passages 43 and 44 formed in body portion 37 of member 36, the passages terminating at first ends thereof at annular and longitudinally spaced grooves 45 and 46, respectively. Second ends of passages 43 and 44 communicate with actuating chambers 47 and 48, respectively. Chamber 47 is defined by housing 34 and one end of member 36 whereas chamber 48 is defined by the housing and the opposite end of the member. It should be further noted in FIG. 2 that passages 29 and 30 connect tank 12 with chambers 47 and 48, respectively, for purposes hereinafter described.

INDUSTRIAL APPLICABILITY

Fluid control circuit 10 of FIG. 1 is particularly adapted for selectively controlling the actuation of double-acting cylinder 13 and a work tool 19 connected thereto. The work tool may comprise a standard ripper attachment employed on a construction vehicle, for example.

Assuming that pump 11 has been activated by running an engine of a vehicle and that directional control valve 14 is maintained in its neutral or second position illustrated in FIG. 1, pressurized fluid from pump 11 will be vented to tank 12 via line 15 and passages formed in valve 14. Referring to FIG. 2, an annular land 50, formed on body portion 37 of member 36 to separate grooves 45 and 46, is simultaneously positioned to block line or passage 27.

Assuming that the operator now desires to retract cylinder 13 to move work tool 19 to a selected position of operation, he will move directional control valve 14 downwardly to its first operative position to connect line 15 with line 17. Thus, pressurized fluid is communicated to the rod end of cylinder 13 via lines 15 and 17 and fluid is exhausted from the head end of the cylinder via line 16 which now connects with tank 12. When the fluid pressure in the rod end of cylinder 13 exceeds a predetermined level or peak (e.g., 2,200 psi), inline relief valve 22 will open to communicate pressurized fluid to relief valve 26 and kick-out means 28, via lines or passages 23 and 27.

Referring again to FIG. 2, since valve spool 33 has now moved rightwardly from its illustrated second or neutral position, kick-out member 36 will also move rightwardly due to its attachment at 38 to the valve spool to communicate groove 45 with line 27. Pressurized fluid (e.g., 250 psi) is thus communicated to first chamber 47, via passage 43, to move kick-out member 36 and valve spool 33 leftwardly to override the opposed input force or standard detent mechanism (not shown) holding the spool in its selected operating position to return the kick-out member and valve spool to their FIG. 2, neutral or second positions. The pressurized fluid in the rod end of cylinder 13 (FIG. 1) is thus isolated to retain piston 18 of the cylinder in its retracted condition of operation.

Now assuming that the operator desires to extend cylinder 13 from its retracted condition, he will move directional control valve 14 upwardly from its illustrated second or neutral position to its third position whereby line 15 will connect with line 16 and line 17 will connect with tank 12. Thus, the head end of cylinder 13 will be pressurized with fluid while the rod end of the cylinder will be exhausted simultaneously. Referring once again to FIG. 2, valve spool 33 and kick-out member 36 will now be positioned leftwardly from their positions shown to communicate passage 27 with annular groove 46.

Thus, chamber 48 will become pressurized, via passage 44, to return valve spool 33 and kick-out member 36 to their neutral or second positions illustrated in FIGS. 1 and 2 once the predetermined system pressure has been reached. Simultaneously therewith, passage 29 will exhaust chamber 47 to tank, via orifice 31 which functions to closely control this venting function to prevent an abrupt change in the position of the valve spool. Passage 30 and orifice 32 function in a like manner when the valve spool is moved in an opposite direction.

With directional control valve 14 now maintained in its illustrated neutral or second position, line 15 will be connected with tank 12 whereas lines 16 and 17 will be blocked-off to retain cylinder 13 in its extended position. As suggested above, the ability of control circuit 10 to connect line 15 with tank 12 in this manner, insures that the circuit will not overheat and that pressure relief valve 20 need not be utilized to exhaust excess pressure from the circuit. As further discussed above, the ability to detachably connect kick-out member 36 to an end of valve spool 33 provides a relatively non-complex and compact valve arrangement which will efficiently provide the dual kick-out function described above. The ease of servicing and assembly during manufacturing are also obvious benefits.

Other aspects, objects and advantages of this invention can be obtained from a study of the drawings, the disclosure and the appended claims.

What is claimed is:

1. In combination, a resettable valve spool (33) including a manual actuation means, said resettable spool valve (33) being an inlet and exhaust valve having two control positions and a neutral position and sequentially movable to various linear positions to control fluid flow therethrough,
   a valve kick-out member (36) having pressure responsive first and second ends,
   attachment means (38) for detachably connecting said valve kick-out member (36) to an end of said valve spool (33) by relative lateral movement between said kick-out member (3b) and said valve spool (33),
   first passage means (43) for communicating fluid from an inlet (45) thereof to the first end of said valve kick-out member (36),
   second passage means (44) for communicating fluid from an inlet (46) thereof to the second end of said valve kick-out member (36), each of said first (43) and second (44) passage means being formed in said kick-out member (36),
   an annular land (50) formed on the periphery of said kick-out member (36) to longitudinally separate the inlets (45,46) to said first (43) and second (44) passage means, and
   a pair of longitudinally-spaced annular first and second grooves formed on said kick-out member (36) on either side of said land (50) to define the inlets (45,46) to the first (43) and second (44) passage means, respectively, said first (43) and second (44) passage means terminating at said first and second grooves, respectively, on opposite sides of said land (50).

* * * * *